United States Patent [19]

Coleman

[11] Patent Number: 5,754,302
[45] Date of Patent: May 19, 1998

[54] COLOR ORDER IN PREDICTING PILE HEIGHT CONSTRAINTS IN A XEROGRAPHIC COLOR PRINTING SYSTEM

[75] Inventor: Robert M. Coleman, Altadena, Calif.

[73] Assignee: Xerox Corporation, Stamford, Conn.

[21] Appl. No.: 653,184

[22] Filed: May 24, 1996

[51] Int. Cl.$^6$ .............................. H04N 1/23; H04N 1/46; G03F 3/08
[52] U.S. Cl. ............................................ 358/296; 358/518
[58] Field of Search ...................... 358/296, 298, 358/501, 515, 517, 518–523, 529, 530; 399/39–41

[56] References Cited

U.S. PATENT DOCUMENTS

| | | | |
|---|---|---|---|
| 4,751,535 | 6/1988 | Myers | 358/520 X |
| 4,959,790 | 9/1990 | Morgan | 358/518 X |
| 5,231,504 | 7/1993 | Magee | 358/520 |
| 5,402,253 | 3/1995 | Seki | 358/518 |

*Primary Examiner*—Eric Frahm
*Attorney, Agent, or Firm*—Robert Cunha

[57] ABSTRACT

A digital color printing method is described for printing process black over a background color, which makes use of color order information—that is, the order in which process colorants are transferred to paper—in determining and satisfying pile height constraints for optimal quality. In certain printing systems such as xerographic systems, printing problems can occur when process black, composed of a mixture of colorants such as cyan, magenta, yellow, and black, is printed over a color background. One such problem for example occurs when a process black containing all colorants at maximum or near-maximum value is printed on a color field. In this case, the excessive toner pile height of such a process black can sometimes cause objectionable deletions in the surrounding color field, caused by interference in the transfer of toner to the background color field surrounding the process black. Systems have been described which calculate the pile height of the process black in relation to its background color and reduce the process black colorant levels to conform to parametric pile height requirements. However, the minimal reduction of process black colorants is desired in order to avoid other potential printing problems. This invention proposes that in some systems, the order in which colorants are transferred to the paper may be taken into account in calculating total pile height, and the information of colorant order may be used to minimize the reduction of the colorant levels in process blacks.

2 Claims, 4 Drawing Sheets

COLOR ORDER IN PREDICTING PILE HEIGHT CONSTRAINTS IN A XEROGRAPHIC COLOR PRINTING SYSTEM

BACKGROUND OF THE INVENTION

1. Field of the Invention

The present invention relates to digital color printing in which black objects and color objects are intermixedly printed, and more particularly, in which reductions in the non-black colorants comprising each process black object may be minimized by using information about the order in which process colorants are transferred to paper during the printing process.

2. Description of the Related Art

Digital color printers use a plurality of colorants, such as cyan, magenta, yellow, and black, to form images which appear to the human visual system to contain a multitude of colors. In particular, the color black may be formed in a number of ways. First, it may be formed of equal or nearly equal combinations of cyan, magenta, and yellow. In practice, the black colorant is also often added to the combination of cyan, magenta, and yellow colorants to increase the maximum density and avoid problems of unwanted color. When black is formed with a mixture of some of cyan, magenta, yellow, and black, it is a type of black color known as process black. Alternatively, the color black may be formed with black colorant only. In this case, it is known as single-color black.

Process black is often used in contexts in the printing process in which a high-coverage, high-density, glossy black is needed. It is often used for example when a black object is to be printed over a color background. There are several benefits to using process black in this situation instead of single-color black. First, the gloss of a process black object in general corresponds better with the gloss of the surrounding color field. Second, on certain dense color backgrounds process black is used so that its density will better correspond to the density in the background color. Third, the ink coverage or toner pile height of process black may better match that of the surrounding color background. Finally, the presence of misregistration between the plurality of separations during the printing process, or the presence of other interactions between the separations, can result in objectionable white fringing around a single-color black object on a color background, but a process black object can avoid this problem.

However, process black can cause other problems if the same formulation of process black is used against a variety of color backgrounds. For example, a dense process black with a large amount of colorant, which might be suitable for printing over a dense or dark color background, when printed on a light colored background can create pile height differences between the black object and its light colored background. This can result in printing defects such as toner deletion in the background color surrounding the black object. However, if the C, M, Y content of a process black is significantly reduced to avoid the problem of deletions in the surrounding color background, the chances for showing light-colored fringes around the process black object due to misregistration is increased.

It is therefore desirable to reduce the colorant content of a process black minimally, and as importantly, to identify methods which more accurately predict the necessity of reducing the colorant content to avoid the problem of toner deletion in the surrounding color field.

The current method of assessing when it is necessary to reduce the colorant content of a process black does so simply by calculating the total pile height and determining when that total exceeds a certain value, parameterized for each particular color printing system. Instead, this invention proposes that in certain types of color printing systems, the order in which colorants are transferred may be used to refine the determination of which process blacks printed on background colors are likely to show the xerographic defect of toner detections in the background color surrounding a process black.

OBJECTS AND SUMMARY OF THE INVENTION

An object of the present invention is to provide a method which minimizes the changes to the formulation of process black printed over a background color in certain xerographic color printing systems by accounting for the order in which colorants are transferred within the print engine when calculating the total allowable pile height differences between the background color and the foreground process black.

To achieve the foregoing and other objects and to overcome the shortcomings discussed above, a digital color printing method is provided which has knowledge of the order in which colorants are transferred within a color printing system, and which takes such color order into account when calculating whether a formulation of process black with a known amount of non-black colorants will encounter xerographic pile height-related printing deficiencies when printed over a known background color.

In particular, in certain xerographic color printing systems, the problem with excessive pile height is due to difficulties within the step of transferring toner from the photoconductor to either the printing substrate or an intermediate belt. In these systems, the total accumulated pile height on the substrate or intermediate belt which has already been transferred may interfere electrostatically or mechanically with the subsequent transfer of later colorants. In such a printing system, it is possible to establish a maximum toner pile height difference between a foreground color and a background color which will be likely to cause transfer difficulties. However, according to the method of the invention, in these particular cases where the problem is caused within the toner transfer step, it is possible in calculating whether a pile height problem exists to ignore the amount of the last colorant transferred, because since no further transfers of toner will take place, only the accumulated pile height of the toners preceeding the final toner is relevent.

Thus, it is possible that in certain cases of foreground and background colors which have a strong component of the last colorant transferred, in which previous methods might predict pile height related difficulties, the method of the current invention would be able to produce a refined prediction which would indicate little or no transfer difficulties, thus reducing the necessity of overly reducing the colorant values of the foreground process black.

BRIEF DESCRIPTION OF THE DRAWINGS

The invention will be described in detail in reference to the following drawings in which like reference numerals refer to like elements and wherein.

DETAILED DESCRIPTION OF THE PREFERRED EMBODIMENTS

Figure 1:
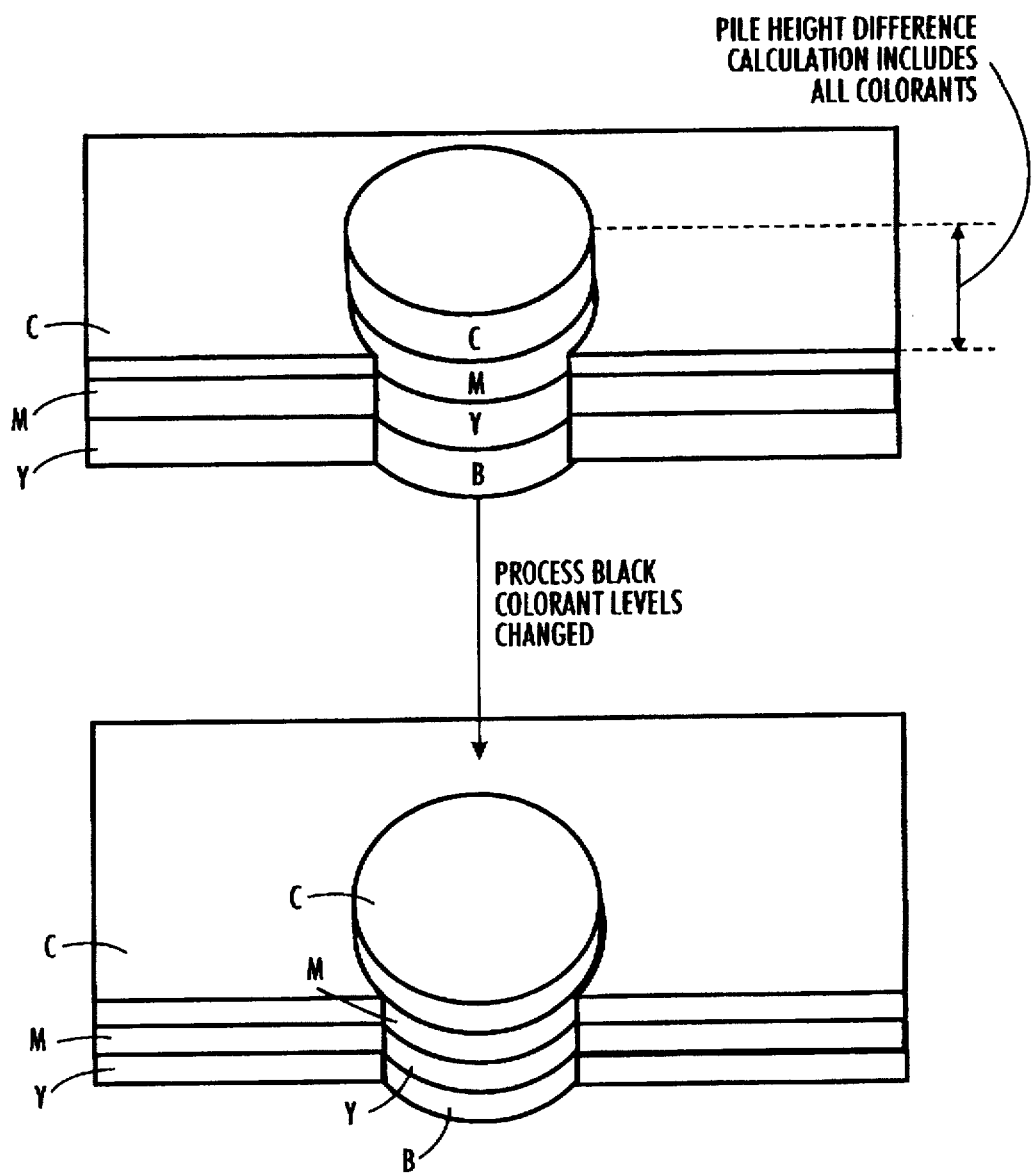
FIG. 1 shows an output in the prior art in which a process black with high levels of non-black colorants is predicted to have an excessive pile height with respect to the background color, and the colorant levels are therefore reduced to reduce the total pile height.

Referring now to the drawings, and particularly to FIG. 1 thereof, a process black object containing uniform large amounts of cyan, magenta, and yellow (C, M, Y) toners is calculated according to the prior art to have an excessive pile height, since the total pile height of all toners in the process black object is used in the calculation. Therefore, because the total of the process black's K+Y+M+C is found to be in excess of the allowed pile height over the background color, the non-black colorant content of the process black is adjusted to reduce the pile height difference between the background color and the foreground process black.

However, the adjustment process called for in the prior art may sometimes be objectionable, because new problems can be introduced. For example, by reducing the magenta content of the process black significantly below the magenta content of the background color as is shown in the lower part of FIG. 1, it is possible that if the black separation is misregistered with respect to the magenta separation, the large drop in magenta value at the edge of the process black object will be seen as a light-colored magenta fringe surrounding the process black object. Furthermore, the step of adjusting the color content of a process black object creates an additional step which will, if repeated numerous times in certain complex documents, result in an objectionable performance degradation.

Thus, it is preferable to avoid the step of adjusting the non-black colorant levels in a process black if possible, and so a predictive calculation which more accurately predicts problem situations and thus eliminates some process black object adjustments is desirable.

Figure 2:
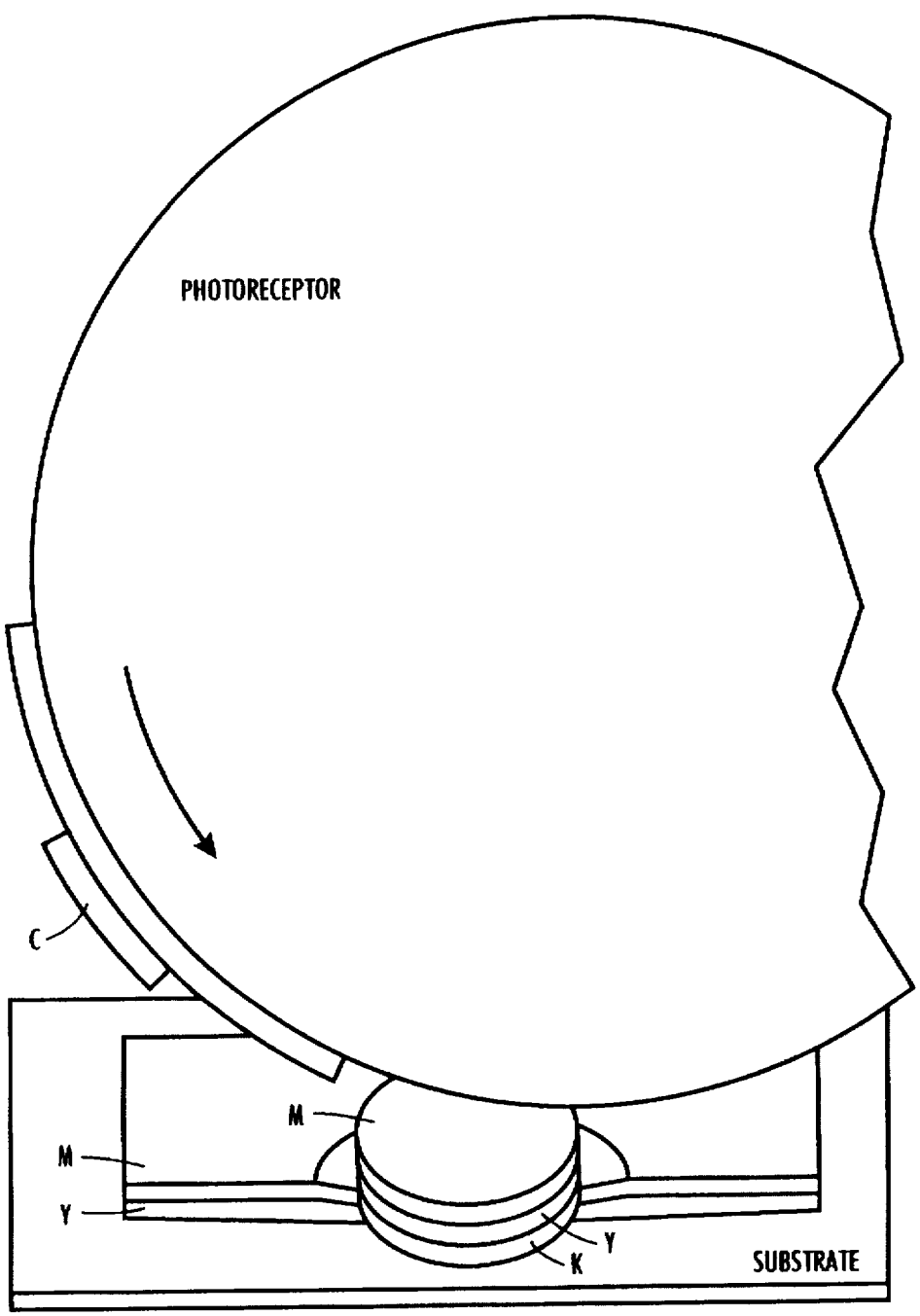
FIG. 2 shows a process of transferring toner in which the total pile height of the already transferred toner interferes with the transfer of the following toner, thus producing xerographic problems such as deletions in the surrounding background color.

FIG. 2 shows more clearly the problem addressed by the method of this invention. As shown in FIG. 2, if one part of an image, such as the process black object shown in FIG. 2, is excessively higher than the surrounding background, it is possible for the presence of the high toner pile to mechanically or electrostatically interfere with the full transfer to the printing substrate of the following toner layers. This problem shows up as objectionable deletions in the toner coverage in the background color surrounding the process black object. However, as may be determined by examining FIG. 2, since no toner layers are transferred after the final toner layer is transferred, clearly the final toner layer makes no contribution to the problem of ineffective transfer of toner due to the excessive toner height of already transferred toner. By the time the final layer of toner is transferred, the amount of toner height which has been added by the final layer of toner is irrelevent to the problem of toner transfer, since all toner has already been transferred.

Figure 3:
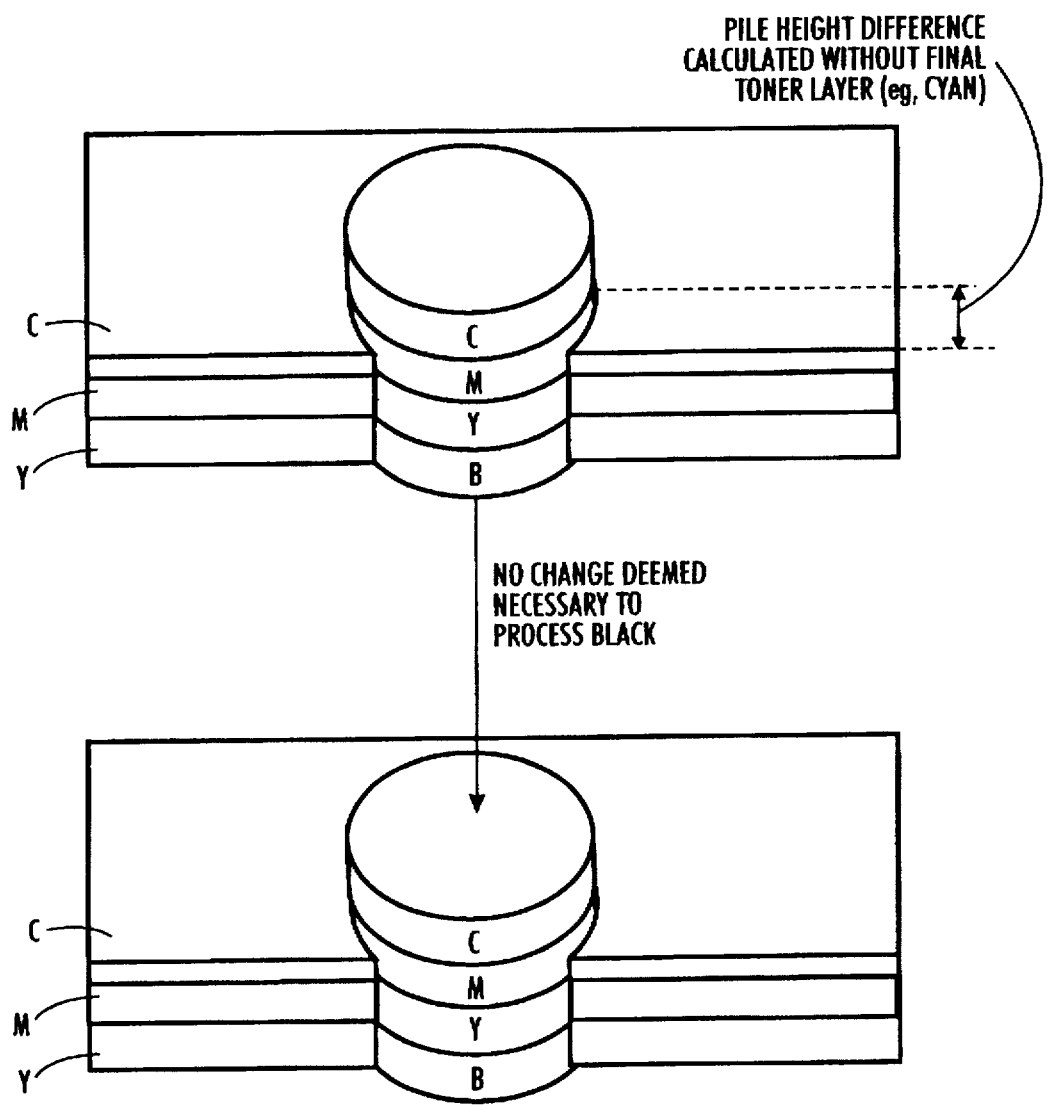
FIG. 3 shows an output by the method of this invention in which the pile height of the last colorant to be transferred is ignored, and the pile height of the process black relative to the background color is found to be acceptable, so that no adjustments are necessary.

Thus, as shown in FIG. 3, if the pile height of the process black object is calculated taking into account the order in which toners are transferred, a different prediction may be made as to whether the colorant content of the process black need be adjusted. FIG. 3 shows a toner transfer order of black first, then yellow, then magenta, and finally cyan. As shown in FIG. 3, if the contribution of the cyan layer (the last toner to be transferred) to total pile height is ignored, in some cases if the total pile height of K+Y+M in the foreground process black object is compared to the K+Y+M pile height of the background color, the difference will be found to be within acceptable limits, and the colorant content of the process black object will not need to be adjusted. As mentioned above, the result of not doing the adjustment is that the performance of the printing system may be improved and also that certain problems such as light-colored fringing due to misregistration may be avoided.

To give a numerical example, suppose a process black object has 75% CMY values and full K (e.g., C=M=Y=75 and K=100 on a scale of 0 to 100). Assume also that the background color contains (C,M,Y) values of (10, 100, 100). Finally, assume that it is found necessary for the pile height of the process black to be no more than 50 units above the pile height of the background color in order to avoid problems of deletions in the background color due to transfer difficulties.

In the case of the prior art, the calculation of pile height includes the contributions of all toner layers. Thus, the process black object is found to have a total pile height of (C+M+Y+K)=(75+75+75+100)=325. By the same method, the background color is found to have a total pile height of (C+M+Y+K)=(10+100+100+0)=210.

Since by the prior art calculation the pile height difference is found to be 325−210=115, and the total difference is in this example allowed to be no more than 50, the prediction is made that the pile height difference is too great, and the CMY values in the process black must be adjusted to reduce the total pile height of the process black object. To bring the pile height of the process black object within 50 units of the pile height of the background color, the CMY values in the process black are each reduced by 22 units, so that the new process black values are CMYK=(53, 53, 53, 100), for a total pile height of 259, which is within 50 units of the pile height of the background color (210).

Note, however, that by adjusting the process black in this way, a large step has been created in the magenta separation in the direction of heavy magenta in the background (100) to much lighter magenta in the foreground process black (53). This kind of large sudden change in the direction of darker to lighter can be problematic, because if the black separation is slightly misregistered, the magenta separation will show a tiny light-magenta fringe on the edge of the process black, a fringe which by contrast to the dark black object it abuts will be visually noticeable and objectionable.

By the method of the current invention, by contrast, the contribution of the final toner layer (in this case, cyan) is ignored in performing the pile height calculations for both the background color and the foreground process black. By this method, the calculated pile height of the foreground black is (M+Y+K)=(75+75+100)=250. The calculated pile height of the background color is (M+Y+K)=(100+100+0)=200. By the method of this invention, then, the prediction is made that there will be no problem with toner transfer since the first three toner layers in the foreground and background are within an acceptable height difference of each other.

Thus, by the method of this invention no adjustments are made to the colorant values in the process black object, and therefore the problem described in the prior art method wherein the adjustment of magenta produces a light-colored fringe surrounding the process black object is avoided.

Figure 4:
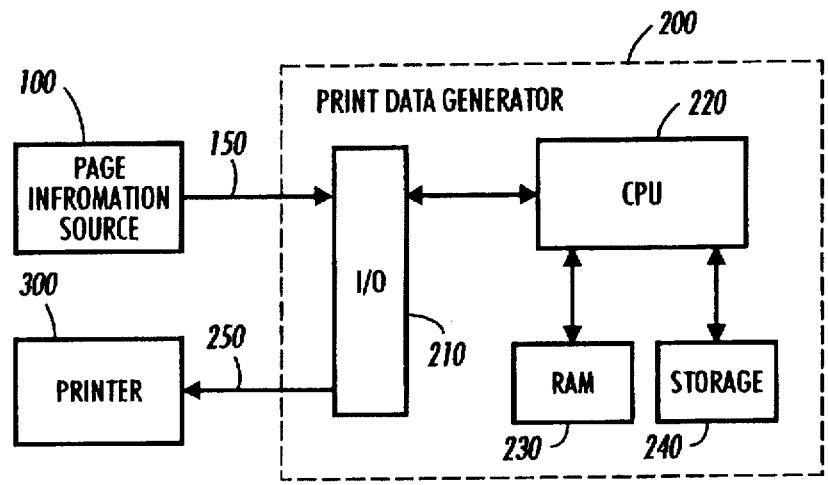
FIG. 4 is a block diagram of an apparatus made according to and for practicing the method of the invention, in which the changes to the composition of process black objects take place within the print data generator.

Referring now to FIG. 4, a generalized page printing system made according to the present invention is shown. It includes a page information source 100 connected via a communication link 150 to a print data generator 200. Generator 200 is connected to a printer 300 via a communication link 250. Generator 200 includes an I/O controller 210, a CPU (central processing unit) 220, a RAM 230 which can store program and data information, and a storage apparatus 240 for non-volatile storage. These devices 210–240 may be any of a number of conventional devices generally available. Other hardware that accomplish the same functions can be used. As will be seen, various embodiments are realizable from this general structure.

Typically, page information source 100 may be a conventional work station or other computer system such as an IBM PC or Apple Macintosh. Communication link 150 may be a part of a computer network or a dedicated link. Print data generator 200 is usually a dedicated computer attached to a printer 300 such as one of many electromechanical devices responsive to raster data for producing a printed page. Many other configurations are possible. For example, generator 200, programmed to function as described herein, could also be incorporated together in the same computer running the page source 100 software. In this case of shared computer hardware and separate software, the functions of page information source 100 and print data generator 200 remain distinct. The methods as described herein remain applicable through a wide range of apparatus configurations.

FIG. 4 shows an embodiment in which the print data generator 200 is programmed to carry out the methods described herein. In this case, a page representation is received from conventional page source 100. The page representation may be a conventional page description language such as the language available from Adobe Systems Incorporated known as PostScript, or an equivalent. In the page representation received from the page source 100, objects such as text, graphics, or pictures can be created and placed on the page in arbitrary order. The objects are defined by descriptive commands, some of which control the location, shape, orientation, and size of an object. At least one command controls the color of an object. An object's color may include neutral colors such as black and grey. Objects may overlap each other, and a priority method determines which objects are on top of other objects.

As further discussed herein, when a page representation is received from a conventional page source 100 by print data generator 200 and generator 200 is programmed to carry out the method of this invention, generator 200 may in certain situations modify the output commanded by the page representation. As described herein, generator 200 may change the formulation of a process black object contrary to the command of the page representation before merging it into the generated print data. Thus, the page as sent by a conventional page information source 100 will be printed differently than specified, in order to accomplish the objectives of this invention for improving print quality. The advantage of this configuration is that page representations received from any number and variety of conventional page sources 100 may be automatically modified by generator 200 to print with higher quality.

Figure 5:
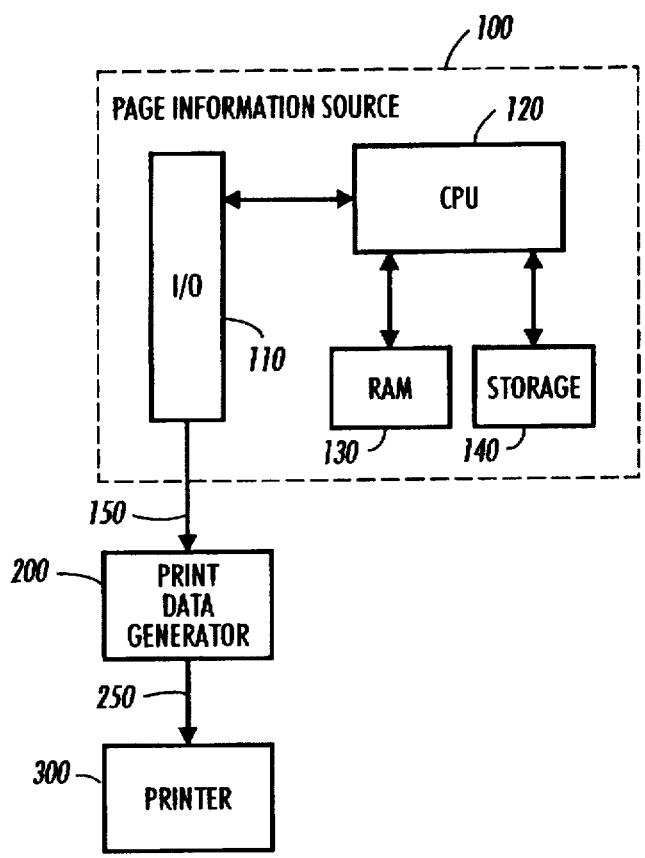
FIG. 5 is a block diagram of an apparatus made according to and for practicing the method of the invention, in which the changes to the composition of process black objects take place within the page information source.

In FIG. 5, a different apparatus and configuration is shown. In this case, the page information source 100 includes resources such as I/O controller 110, CPU 120, RAM 130, and storage 140 which allow page source 100 to be programmed to carry out the methods of the invention described herein. In this apparatus, before a page representation is sent via communication link 150 to a conventional print data generator 200, the methods of this invention are applied in order to produce a page representation which achieves the objectives of this invention by reformulating the process black objects in the image. In this configuration, the print data generator 200 may be conventional and the page information source 100 is programmed according to the methods of this invention. The advantage of this configuration of apparatus is that the page representation, which has been modified according to this invention to automatically determine a process black formula, will be printed with higher quality by any conventional print data generator 200 and printer 300.

While this invention has been described in conjunction with specific embodiments thereof, it is evident that many alternatives, modifications, and variations will be apparent to those skilled in the art. For example, this method of reducing the amount of colorant can be used in all types of color printers such as ink jet printers, laser printers and the like. Accordingly, the preferred embodiments of the invention as set forth herein are intended to be illustrative, not limiting. Various changes may be made without departing from the spirit and scope of the invention as defined in the following claims.

What is claimed is:

1. A method of generating and printing a pixel on a printed page over a background which may not have any colorant comprising the steps of:

generating a representation of the pixel and its background on a page information source coupled to a printer, the page representation specifying that the pixel comprises two or more original layers of amounts of colorants, using the amount of original colorant in all but the top layer of colorants of the printing process, in the pixel and the background, to calculate the maximum allowable colorant amount of all final layers for colorant but the top layer of the pixel colorants, calculating a final actual amount of colorant in all but the top layer of colorants so as not to exceed the calculated allowable colorant amount, and using the printer to print the pixel by using the final actual amounts of colorants for all but the top layer of colorant, and the original top layer for the top final layer of colorant.

2. A method of generating and printing a pixel on a printed page over a background which may not have any colorant comprising the steps of;

generating a representation of the pixel and the background on a page information source coupled to a printer, the representation specifying that the pixel comprises two or more original layers of amounts of colorants, one layer of colorant of which is determined not to contribute to a known printing defect, using the total amount of original colorant in all but the one layer of colorant of the pixel and the background to calculate the maximum allowable colorant amount of all but the one layer of the pixel colorants, calculating an actual amount of colorant for each layer of colorant but the one layer of colorants so as not to exceed the maximum calculated colorant amount, and using the printer to print the pixel by using the actual amounts of colorants for all but the one layer of colorant, and the original one layer amount for the one layer of colorant.

* * * * *